(12) United States Patent
Endo et al.

(10) Patent No.: US 11,794,456 B2
(45) Date of Patent: *Oct. 24, 2023

(54) LAMINATED STRETCHED POLYAMIDE FILM

(71) Applicant: TOYOBO CO., LTD., Osaka (JP)

(72) Inventors: Takuro Endo, Inuyama (JP); Kosuke Hama, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 85 days.

This patent is subject to a terminal disclaimer.

(21) Appl. No.: 17/441,191

(22) PCT Filed: Mar. 10, 2020

(86) PCT No.: PCT/JP2020/010311
§ 371 (c)(1),
(2) Date: Sep. 20, 2021

(87) PCT Pub. No.: WO2020/195795
PCT Pub. Date: Oct. 1, 2020

(65) Prior Publication Data
US 2022/0153007 A1    May 19, 2022

(30) Foreign Application Priority Data

Mar. 28, 2019   (JP) ................. 2019-063701

(51) Int. Cl.
*B32B 27/34* (2006.01)
*B32B 7/12* (2006.01)
*B32B 27/08* (2006.01)
*B32B 27/20* (2006.01)

(52) U.S. Cl.
CPC ........... *B32B 27/34* (2013.01); *B32B 7/12* (2013.01); *B32B 27/08* (2013.01); *B32B 27/20* (2013.01); *B32B 2250/03* (2013.01); *B32B 2250/24* (2013.01); *B32B 2270/00* (2013.01); *B32B 2307/518* (2013.01); *B32B 2307/558* (2013.01); *B32B 2307/7265* (2013.01); *B32B 2307/732* (2013.01); *B32B 2439/46* (2013.01)

(58) Field of Classification Search
CPC ........... B32B 2250/03; B32B 2250/24; B32B 2270/00; B32B 2307/518; B32B 2307/558; B32B 2307/7265; B32B 2307/732; B32B 2439/46; B32B 27/08; B32B 27/20; B32B 27/34; B32B 7/12; B32B 2250/40; B32B 2264/02; B32B 2264/1021; B32B 2264/303; B32B 2307/30; B32B 2307/306; B32B 2307/308; B32B 2307/54; B32B 2307/546; B32B 2307/581; B32B 2307/5825; B32B 2307/7244; B32B 2307/734; B32B 2307/746; B32B 2307/748; B32B 2439/70; B32B 27/16; B32B 27/18
See application file for complete search history.

(56) References Cited

U.S. PATENT DOCUMENTS

| | | |
|---|---|---|
| 5,094,799 A | 3/1992 | Takashige et al. |
| 2002/0018905 A1 | 2/2002 | Okudaira et al. |
| 2008/0248268 A1 | 10/2008 | Delius et al. |
| 2022/0266580 A1 | 8/2022 | Goto et al. |

FOREIGN PATENT DOCUMENTS

| | | |
|---|---|---|
| CN | 1349458 A | 5/2002 |
| CN | 102190120 A | 9/2011 |
| EP | 1172202 A1 | 1/2002 |
| EP | 1167018 A3 | 8/2003 |
| JP | S57-008647 B2 | 2/1992 |
| JP | H06-037081 B2 | 5/1994 |
| JP | 2000-238216 A | 9/2000 |
| JP | 2002-029014 A | 1/2002 |
| JP | 2002-103446 A | 4/2002 |
| JP | 2003-251772 A | 9/2003 |
| JP | 4178814 B2 | 11/2008 |
| JP | 2009-154294 A | 7/2009 |
| JP | 2010-253713 A | 11/2010 |
| JP | 4660866 B2 | 3/2011 |
| JP | 5068084 B2 | 11/2012 |

(Continued)

OTHER PUBLICATIONS

Japanese Patent Office, International Search Report in International Patent Application No. PCT/JP2020/010311 (dated Jun. 16, 2020).
European Patent Office, Extended European Search Report in European Patent Application No. 20779438.9 (dated Nov. 8, 2022).
China National Intellectual Property Administration, Office Action in Chinese Patent Application No. 202080022334.2 (dated Sep. 30, 2022).

(Continued)

*Primary Examiner* — Lawrence D Ferguson
(74) *Attorney, Agent, or Firm* — Leydig, Voit & Mayer, Ltd.

(57) ABSTRACT

It is provided that the laminated stretched polyamide film having excellent water-resistant adhesiveness (water-resistant lamination strength), shock resistance, and pinhole resistance. A laminated stretched polyamide film that is a biaxially stretched polyamide film comprising three layers including layer B: an easily adhesive layer, layer A: a base layer, and layer C: a slippery layer in this order, wherein the layer A contains not lower than 65% by mass of polyamide 6, the layer B contains 0 to 40% by mass of polyamide 6 and 60 to 100% by mass of a polyamide 6 copolymer in which a ratio of a copolymerization component in the copolymer is 3 to 35% by mass, and the layer C contains not lower than 70% by mass of polyamide 6 and 0.05 to 1% by mass of fine particles having an average particle diameter of 0.1 to 10 μm.

20 Claims, No Drawings

(56) References Cited

FOREIGN PATENT DOCUMENTS

JP      5383563 B2      1/2014

OTHER PUBLICATIONS

Intellectual Property India, Examination Report in Indian Patent Application No. 202147045386 (dated Sep. 23, 2022).
Japanese Patent Office, International Search Report in International Patent Application No. PCT/JP2020/032243 (dated Oct. 27, 2020).
U.S. Appl. No. 17/765,623, filed Mar. 31, 2022.
Taiwan Intellectual Property Office, Office Action in Taiwanese Patent Application No. 109108862 (dated May 29, 2023).
China National Intellectual Preoprty Adminsitration, Office Action in Chinese Patent Application No. 202080022334.2 (dated Mar. 23, 2023).
Japan Patent Office, Office Action in Japanese Patent Application No. 2020-555088 (dated Aug. 1, 2023).

LAMINATED STRETCHED POLYAMIDE FILM

TECHNICAL FIELD

The present invention relates to a biaxially stretched polyamide film that has excellent adhesiveness. In particular, the present invention relates to a biaxially stretched polyamide film that has excellent water-resistant adhesive strength with a sealant film.

BACKGROUND ART

A biaxially stretched polyamide film has excellent tensile strength, bending strength, pinhole resistance, oil resistance, oxygen gas barrier property, and the like, and therefore, has been used as a packaging material, especially as a material for packaging food.

The biaxially stretched polyamide film is used for a packaging bag, for example. The packaging bag is usually made by: laminating a polyolefin film that is capable of being heat-sealed (also referred to as a sealant film) such as polyethylene, polypropylene, or the like on the biaxially stretched polyamide film; and heat-sealing edges that become closed parts of a bag. Such a biaxially stretched polyamide film has been widely used as a food packaging material.

However, a laminated film composed of the biaxially stretched polyamide film and the sealant film has a problem that when the laminated film is used as a liquid soup bag or a bag for a watery material, the films that have been laminated are separated since the adhesive strength (also referred to as lamination strength) between the films that have been laminated is insufficient. In particular, the laminated film has a disadvantage that when the laminated film is hydrothermally treated at high temperatures such as retorting, water penetrates between the films that have been laminated, and the lamination strength between the biaxially stretched polyamide film and the sealant film decreases greatly.

As a method for improving lamination strength, a method in which a film surface is coated in a film manufacturing process to increase adhesive strength has been proposed (see Patent Literature 1). However, this method has a problem that the productivity is reduced, and the production cost increases. In addition, the method has a problem that blocking and defects such as a stripe and a flaw occur due to the coating. Therefore, a biaxially stretched polyamide film having high lamination strength without a coating is desired.

Accordingly, a laminated polyamide film that is made by co-extruding layers as a surface layer in which a copolymerization polyamide is blended to obtain a unstretched sheet and biaxially stretching the unstretched sheet has been proposed (see Patent Literature 2). However, while lamination strength is improved by this method, the surface of the film has to be coated in a film manufacturing process to obtain high water-resistant lamination strength.

Meanwhile, a method for manufacturing a biaxially stretched polyamide film having an improved sequential biaxial stretching property and composed of a polyamide 6/66 copolymer has been proposed (see Patent Literature 3).

Also, a method for manufacturing a biaxially stretched polyamide 6/66 copolymer film having good thickness precision by a tubular method has been proposed (see Patent Literature 4).

These biaxially stretched polyamide films each composed of a polyamide 6/66 copolymer has a lower melting point compared to those of polyamide 6 and polyamide 66. The biaxially stretched polyamide films therefore have low heat resistance and dimensional stability at high temperatures and are not suitable for use as a film for a packaging bag used for boiling treatment and retorting treatment.

A five-layered biaxially stretched polyamide film made by laminating and extruding a layer composed essentially of polyamide 6, a layer composed of polyamide 6 and polyamide 6/66, and a barrier layer containing a saponified ethylene-vinyl acetate copolymer has been proposed (see Patent Literature 5). However, the film around clip grippers in a tenter cannot be recovered and reused since the five-layered biaxially stretched polyamide film includes the barrier layer containing the saponified ethylene-vinyl acetate copolymer. Using a layer composed essentially of poly(m-xylylene adipamide) as a barrier layer has also been proposed (see Patent Literature 6). However, in this case, the film has a problem of having reduced shock resistance and pinhole resistance.

CITATION LIST

Patent Literature

[PTL 1] Japanese Patent No. 4660866
[PTL 2] Japanese Patent No. 4178814
[PTL 3] Japanese Examined Patent Publication No. S57-8647
[PTL 4] Japanese Examined Patent Publication No. H06-37081
[PTL 5] Japanese Patent No. 5068084
[PTL 6] Japanese Patent No. 5383563

SUMMARY OF THE INVENTION

Problems to be Solved by the Invention

An object of the present invention is to solve the above-described problems of the conventional biaxially stretched polyamide films and to provide, at a low cost, a biaxially stretched polyamide film that has excellent adhesive strength, especially water-resistant lamination strength.

Solution to the Problems

As a result of earnest studies, the present inventors have found that the problems can be solved with a laminated stretched polyamide film made by laminating an easily adhesive layer composed essentially of a polyamide 6 copolymer on a base layer composed essentially of polyamide 6.

The present invention includes the following features.

[1] A laminated stretched polyamide film that is a biaxially stretched polyamide film comprising three layers including layer B: an easily adhesive layer, layer A: a base layer, and layer C: a slippery layer in this order, wherein the layer A contains not lower than 65% by mass of polyamide 6, the layer B contains 0 to 40% by mass of polyamide 6 and 60 to 100% by mass of a polyamide 6 copolymer in which a ratio of a copolymerization component in the copolymer is 3 to 35% by mass, and the layer C contains not lower than 70% by mass of polyamide 6 and 0.05 to 1% by mass of fine particles having an average particle diameter of 0.1 to 10 µm.

[2] The laminated stretched polyamide film according to the above [1], wherein the layer A contains not lower than 70% by mass of the polyamide 6.

[3] The laminated stretched polyamide film according to the above [1] or [2], wherein the laminated stretched polyamide film has a thickness of 5 to 30 μm, the layer A has a thickness of not smaller than 4.0 μm, the layer B has a thickness of not smaller than 0.5 μm, and the layer C has a thickness of not smaller than 0.5 μm.

[4] The laminated stretched polyamide film according to any one of the above [1] to [3], wherein the polyamide 6 copolymer is a polyamide 6/66 copolymer.

[5] The laminated stretched polyamide film according to the above [4], wherein the layer A contains 0.5 to 30% by mass of the polyamide 6/66 copolymer.

[6] The laminated stretched polyamide film according to any one of the above [1] to [3], wherein the polyamide 6 copolymer is a polyamide 6/12 copolymer.

[7] The laminated stretched polyamide film according to the above [6], wherein the layer A contains 0.5 to 30% by mass of the polyamide 6/12 copolymer.

[8] The laminated stretched polyamide film according to any one of the above [1] to [7], wherein the laminated stretched polyamide film has a water-resistant lamination strength of not lower than 2.0 N/15 mm.

The laminated stretched polyamide film of the present invention has excellent tensile strength, impact strength, bending strength, pinhole resistance, oil resistance, and oxygen gas barrier property of a biaxially stretched polyamide film, due to the base layer (layer A) containing not lower than 65% by mass and preferably not lower than 70% by mass of polyamide 6.

The laminated stretched polyamide film of the present invention can contribute to the above-mentioned excellent characteristics of the biaxially stretched polyamide film due to the easily adhesive layer (layer B), and also can have highly increased lamination strength with a sealant film. In particular, the laminated stretched polyamide film can have significantly improved water-resistant lamination strength.

The laminated stretched polyamide film of the present invention can have improved film handleability due to the slippery layer (layer C).

Advantageous Effects of the Invention

The laminated stretched polyamide film of the present invention has high water-resistant lamination strength in addition to the excellent impact strength, pinhole resistance, oxygen gas barrier property, and the like of a biaxially stretched polyamide film. Therefore, the laminated stretched polyamide film is effective for preventing a soup packaging bag, a watery material packaging bag, and the like from breaking due to impact or vibration during transportation.

Also, the laminated stretched polyamide film of the present invention has advantages that the laminated stretched polyamide film has good productivity, is economical, and has few defects such as a flaw due to elimination of a coating process. The laminated stretched polyamide film of the present invention has an advantage that the laminated stretched polyamide film is hygienic since a coating agent is not laminated.

DESCRIPTION OF EMBODIMENTS

Hereinafter, the present invention will be described in detail.

The laminated stretched polyamide film of the present invention is a laminated stretched polyamide film in which an easily adhesive layer (layer B) containing 0 to 40% by mass of polyamide 6 and 60 to 100% by mass of a polyamide 6 copolymer in which a ratio of a copolymerization component in the copolymer is 3 to 35% by mass is laminated on at least one surface of a base layer (layer A) containing not lower than 65% by mass and preferably not lower than 70% by mass of polyamide 6, and a slippery layer (layer C) composed essentially of polyamide 6 and containing 0.05 to 1% by mass of fine particles having an average particle diameter of 0.1 to 10 μm is laminated on a surface of the base layer (layer A) opposite to the layer B.

<Thickness Configuration of Laminated Polyamide Film>

The laminated stretched polyamide film of the present invention has a total thickness of 5 to 30 μm. If the total thickness of the laminated stretched polyamide film is larger than 30 μm, the performance of the laminated stretched polyamide film is saturated in terms of strength. In addition, the flexibility is reduced when such a laminated stretched polyamide film laminated with a sealant is used as a packaging bag.

The base layer (layer A) of the laminated stretched polyamide film of the present invention preferably has a thickness of not smaller than 4.0 μm. The thickness is more preferably not smaller than 4.5 μm. If the thickness of the base layer (layer A) is smaller than 4.0 μm, the entire film becomes too soft to be processed in a printer or a bag making machine.

The easily adhesive layer (layer B) of the laminated stretched polyamide film of the present invention preferably has a thickness of not smaller than 0.5 μm. If the thickness of the layer B is smaller than 0.5 μm, water-resistant lamination strength that is the object of the present invention is not obtained. There is no specific upper limit for the thickness of the layer B. However, the layer B preferably has a thickness of not larger than 5 μm since, when the layer B has a thickness of larger than 5 μm, the water-resistant lamination strength starts to be saturated while the strength of the entire film is decreased.

The slippery layer (layer C) of the laminated stretched polyamide film of the present invention preferably has a thickness of not smaller than 0.5 μm. If the thickness of the layer C is smaller than 0.5 μm, the effect of improving slipperiness becomes diminished. Also, the thickness unevenness tends to increase. There is no specific upper limit for the thickness of the layer C. However, as the thickness of the layer C increases, the transparency of the film tends to deteriorate.

<Base Layer (Layer A)>

The base layer (layer A) of the laminated stretched polyamide film of the present invention contains not lower than 65% by mass and preferably not lower than 70% by mass of polyamide 6. If the base layer contains lower than 65% by mass of polyamide 6, sufficient impact strength, pinhole resistance, dimensional stability at high temperatures, and transparency are not obtained.

Polyamide 6 to be used in the base layer (layer A) is usually manufactured by ring-opening polymerization of ε-caprolactam. ε-caprolactam monomers in the polyamide 6 obtained by the ring-opening polymerization are usually removed with hot water, and then the polyamide 6 is dried and melt-extruded with an extruder.

The polyamide 6 has a relative viscosity of preferably 1.8 to 4.5 and more preferably 2.6 to 3.2. If the relative viscosity is lower than 1.8, the film has insufficient impact strength. If the relative viscosity is higher than 4.5, the load on the extruder becomes large, and it becomes difficult to obtain a sheet before stretching.

The base layer (layer A) may contain 0.5 to 30% by mass of a polyamide 6 copolymer. The adhesive strength between the layer A and the layer B can be increased by including the polyamide 6 copolymer in the layer A. The polyamide 6 copolymer contained in the base layer (layer A) and the polyamide 6 copolymer in the layer B preferably contain the same copolymerization component.

The layer A may contain 0.5 to 30% by mass of polyamide MXD6 (poly(m-xylylene adipamide)). A stretching property can be improved by including the polyamide MXD6. As a result, the effect of suppressing film breakage during production of the film and the effect of reducing film thickness unevenness are provided.

The layer A may contain 0.5 to 30% by mass of a polyamide elastomer or a polyolefin elastomer. The pinhole resistance can be improved by including the polyamide elastomer or the polyolefin elastomer.

Examples of the polyamide elastomer to be used include a polyamide elastomer composed of a hard segment of nylon 12 and a soft segment of polytetramethylene glycol, and the like.

Examples of the polyolefin elastomer to be used include a block copolymer having a polyolefin as a hard segment and various types of rubber component as a soft segment, and the like. Examples of the polyolefin forming a hard segment include ethylene, propylene, 1-butene, 1-pentene, and 4-methyl-1-pentene. Examples of the rubber component forming a soft segment include ethylene-propylene rubber (EPR), ethylene propylene diene rubber (EPDM), and polybutadiene.

<Easily Adhesive Layer (Layer B)>

The easily adhesive layer (layer B) of the laminated stretched polyamide film of the present invention contains 60 to 100% by mass of a polyamide 6 copolymer in which the ratio of a copolymerization component in the copolymer is 3 to 35% by mass.

If the content of the polyamide 6 copolymer in the easily adhesive layer (layer B) is lower than 60% by mass, sufficient water-resistant lamination strength is not obtained.

The ratio of the copolymerization component in the polyamide 6 copolymer is 3 to 35% by mass.

If the ratio of the copolymerization component is lower than 3% by mass, sufficient water-resistant lamination strength is not obtained.

If the ratio of the copolymerization component in the copolymer is higher than 35% by mass, handling may become difficult at the time of supplying the raw material.

The polyamide 6 copolymer has a melting point of preferably 170 to 220° C., more preferably 175 to 215° C., and further preferably 180 to 210° C. If the melting point of the polyamide 6 copolymer is higher than 215° C., sufficient water-resistant adhesiveness may not be obtained. If the melting point of the polyamide 6 copolymer is lower than 170° C., handling may become difficult at the time of supplying the raw material.

The polyamide 6 copolymer to be used in the easily adhesive layer (layer B) is obtained by copolymerizing ε-caprolactam or aminocaproic acid with a copolymerization component in a ratio of 3 to 35% by mass. Here, the ratio of the copolymerization is in % by mass after monomers remaining after the copolymerization are removed with hot water or the like.

The polyamide 6 copolymer is obtained by copolymerizing ε-caprolactam with, for example, a lactam other than ε-caprolactam, an amino acid other than aminocaproic acid, or a salt of a dicarboxylic acid and a diamine, as the copolymerization component. Examples of a monomer to be copolymerized with ε-caprolactam in the polymerization of the polyamide 6 copolymer include undecane lactam, lauryl lactam, amino undecanoic acid, amino lauric acid, adipic acid, pimelic acid, azelaic acid, sebacic acid, terephthalic acid, isophthalic acid, hexamethylenediamine, nonanediamine, decane diamine, methyl pentane diamine, methaxylilene diamine, and trimethyl hexamethylene diamine.

Examples of the polyamide 6 copolymer include a polyamide 6/66 copolymer, a polyamide 6/12 copolymer, a polyamide 6/6T copolymer, a polyamide 6/610 copolymer, a polyamide 6/6I copolymer, a polyamide 6/9T copolymer, a polyamide 6/6I copolymer, and a polyamide 6/11 copolymer.

The polyamide 6/66 copolymer to be used in the easily adhesive layer (layer B) is obtained, for example, by a method in which ε-caprolactam is polymerized with hexamethylene diammonium adipate.

A commercially available product such as Ultramid C3301 (manufactured by BASF), Nylon 5023B (manufactured by Ube Industries, Ltd.), and the like can also be used.

The above products can also be used as the polyamide 6/66 copolymer that may be contained in the layer A in an amount of 0.5 to 30% by mass.

The copolymerization proportion of polyamide 6 and polyamide 66 in the polyamide 6/66 copolymer is such that the ratio of the polyamide 66 in the polyamide 6/66 copolymer is 3 to 35% by mass, preferably 5 to 30% by mass, and more preferably 5 to 25% by mass.

If the ratio of the polyamide 66 in the polyamide 6/66 copolymer is lower than 3% by mass, easy adhesiveness, which is the challenge of the present invention, is not exhibited.

If the ratio of the polyamide 66 in the polyamide 6/66 copolymer is higher than 35% by mass, the crystallinity of the copolymer decreases, and handling of the copolymer may become difficult.

The polyamide 6/66 copolymer has a relative viscosity of preferably 1.8 to 4.5 and more preferably 2.6 to 3.2.

The polyamide 6/12 copolymer to be used in the easily adhesive layer (layer B) is obtained, for example, by a method in which ε-caprolactam is polymerized with ω-lauryl lactam.

A commercially available product such as nylon resin 7024B (manufactured by Ube Industries, Ltd.), and the like can also be used.

The above products can also be used as the polyamide 6/12 copolymer that may be contained in the layer A in an amount of 0.5 to 30% by mass.

The copolymerization proportion of polyamide 6 and polyamide 12 in the polyamide 6/12 copolymer is such that the ratio of the polyamide 12 in the polyamide 6/12 copolymer is 3 to 35% by mass, preferably 5 to 30% by mass, and more preferably 5 to 25% by mass.

If the ratio of the polyamide 12 in the polyamide 6/12 copolymer is lower than 3% by mass, easy adhesiveness, which is the challenge of the present invention, is not exhibited.

If the ratio of the polyamide 12 in the polyamide 6/12 copolymer is higher than 35% by mass, the crystallinity of the copolymer decreases, and handling of the copolymer may become difficult.

The polyamide 6/12 copolymer has a relative viscosity of preferably 1.8 to 4.5 and more preferably 2.5 to 4.0.

The important point in the present invention is that the easily adhesive layer (layer B) containing the polyamide 6 copolymer is laminated on the surface, of the base layer (layer A), on the side on which a sealant is laminated, whereby the degree of crystallinity of the surface on which the sealant is laminated is reduced and the adhesiveness is improved.

<Slippery Layer (Layer C)>

The slippery layer (layer C) of the laminated stretched polyamide film of the present invention contains not lower than 70% by mass of polyamide 6 and 0.05 to 1% by mass of fine particles having an average particle diameter of 0.1 to 10 μm.

By containing not lower than 70% by mass of polyamide 6, the strength of the laminated stretched polyamide film can be maintained.

By containing 0.05 to 1% by mass of fine particles having an average particle diameter of 0.1 to 10 μm, minute protrusions are formed on the surface of the slippery layer (layer C), so that the contact between the laminated stretched film surfaces is reduced, making the film slippery.

The fine particles can be appropriately selected and used from inorganic lubricants such as silica, kaolin, and zeolite and polymeric organic lubricants such as acrylic-based lubricants and polystyrene-based lubricants. It is noted that silica fine particles are preferably used from the viewpoint of transparency and slipperiness.

The fine particles have an average particle diameter of preferably 0.5 to 5.0 μm and more preferably 1.0 to 3.0 μm. If the average particle diameter is less than 0.5 μm, a large addition amount is required to obtain good slipperiness, and if the average particle diameter exceeds 5.0 μm, the surface roughness of the film becomes too large to satisfy practical characteristics such as poor appearance, so that such an average particle diameter is not preferable.

The range of the pore volume of the fine particles is preferably 0.5 to 2.0 ml/g and more preferably 0.8 to 1.6 ml/g. If the pore volume is less than 0.5 ml/g, voids are likely to occur and the transparency of the film deteriorates, and if the pore volume exceeds 2.0 ml/g, protrusions on the surface due to the fine particles are less likely to be formed and the slipperiness of the film deteriorates, so that such a pore volume is not preferable.

The slippery layer (layer C) of the laminated stretched polyamide film of the present invention may contain a fatty acid amide and/or a fatty acid bisamide for the purpose of improving slipperiness. Examples of the fatty acid amide and/or the fatty acid bisamide include erucic acid amide, stearic acid amide, ethylene bisstearic acid amide, ethylene bisbehenic acid amide, and ethylene bisoleic acid amide.

The content of the fatty acid amide and/or the fatty acid bisamide in the polyamide polymer in this case is preferably 0.01 to 0.40% by mass and further preferably 0.05 to 0.30% by mass. If the content of the fatty acid amide and/or the fatty acid bisamide is lower than the above range, the slipperiness is poor and processing suitability in printing, laminating, and the like is poor, and if the content of the fatty acid amide and/or the fatty acid bisamide exceeds the above range, spots may occur on the film surface due to bleeding on the surface over time, so that such a content is not preferable in terms of quality.

The base layer (layer A), the easily adhesive layer (layer B), and/or the slippery layer (layer C) of the laminated stretched polyamide film of the present invention may contain various additives such as a heat stabilizer, an antioxidant, an antistatic agent, a light resisting agent, an impact modifier, a lubricant, and an antiblocking agent, as long as the characteristics such as water-resistant lamination strength are not impaired.

The method for laminating the easily adhesive layer (layer B) and the slippery layer (layer C) on the base layer (layer A) is preferably a co-extrusion method using a feed block, a multi-manifold, or the like. Other than the co-extrusion method, a dry lamination method, an extrusion lamination method, or the like can also be selected.

When lamination is performed by the co-extrusion method, a relative viscosity of polyamide to be used for the layer A, the layer B, and the layer C is preferably selected such that the difference between the melt viscosities of the layer A, the layer B, and the layer C is reduced.

The method for obtaining the laminated stretched polyamide film of the present invention may be either a sequential biaxial stretching method or a simultaneous biaxial stretching method. The sequential biaxial stretching method is preferable since the sequential biaxial stretching method is capable of increasing a film manufacturing speed, and therefore, has an advantage in terms of cost. The film may be a uniaxially stretched film made by a uniaxial stretching method. The uniaxial stretching method produces a uniaxially stretched polyamide film that has good lamination strength. However, the biaxially stretched polyamide film has better shock resistance and pinhole resistance.

As for a device, a conventional sequential biaxial stretching device is used. As for manufacturing conditions, preferable ranges include: an extrusion temperature of 200° C. to 300° C., a stretching temperature in a machine direction (may be abbreviated as MD), which is a flow direction of the device, of 50 to 100° C., a stretch ratio in the machine direction of 2 to 5 times, a stretching temperature in a transverse direction (may be abbreviated as TD) of the device of 120 to 200° C., a stretch ratio in the transverse direction of 3 to 5 times, and a heat setting temperature of 200° C. to 230° C.

As for the stretching conditions of the laminated stretched polyamide film of the present invention, the laminated stretched polyamide film is preferably stretched not less than 2.8 times in each of the machine direction and the transverse direction, and further preferably not less than 3.2 times in the transverse direction. A higher heat setting temperature is preferable since a higher heat setting temperature tends to give higher water-resistant lamination strength. When the heat setting temperature is lower than 200° C., sufficient water-resistant lamination strength and thermal dimensional stability may not be obtained.

When further improvement of the adhesive strength with a sealant is desired, a coating layer may be provided between a layer containing a polyamide copolymer and a sealant layer. In this case, the coating agent is preferably water-resistant to improve water-resistant lamination strength. When improvement of the adhesive strength with a sealant is desired, a corona treatment, a flame treatment, or the like may be performed.

EXAMPLES

Hereinafter, the present invention is described more specifically by means of examples. However, the present invention is not limited to the examples, as long as the gist of the present invention is not exceeded.

Film evaluation was made based on the following measurement methods. Unless otherwise specified, measurements were performed in a measurement room having an environment of 23° C. and a relative humidity of 65%.

(1) Thickness of Film

A film was cut into 10 equal parts in the transverse direction (TD) (as for a narrow film, the film was cut into equal parts such that a width that allows a measurement of a thickness can be ensured). The 10 films were stacked on top of each other, cut into a 100 mm film in the machine direction, and conditioned in an environment at a temperature of 23° C. and a relative humidity of 65% for 2 hours or longer.

A thickness at the center of each sample was measured with a thickness measurement device manufactured by TESTER SANGYO CO., LTD., and the average value of the measurements was used as a thickness.

As for the thicknesses of a base layer (layer A), an easily adhesive layer (layer B), and a slippery layer (layer C), a discharge quantity of the base layer (layer A) and discharge quantities of the easily adhesive layer (layer B) and the slippery layer (layer C) were measured, and the thickness of the base layer (layer A) and the easily adhesive layer (layer B) were calculated on the basis of the total thickness of the laminated stretched polyamide film measured by the above method and the ratio of the discharge quantities.

(2) Coefficient of Dynamic Friction of Film

The coefficient of dynamic friction between surfaces of the layer C of a film was evaluated according to JIS-C2151 under the following conditions.

Measurement atmosphere: 23° C., 50% RH (relative humidity)
Test piece: width 130 mm, length 250 mm
Test speed: 150 mm/min (3) Impact Strength of Film Using a film impact tester manufactured by Toyo Seiki Seisaku-sho, Ltd., measurement was performed 10 times in an environment having a temperature of 23° C. and a relative humidity of 65%, and the average value was evaluated. The impact spherical surface used was one having a diameter of ½ inch. The unit used was J.

(4) Heat Shrinkage Rate of Film

A film was cut into 5 pieces in the machine direction (MD) and the transverse direction (TD) such that each piece had a width of 20 mm×a length of 250 mm and the obtained 5 pieces were used as test pieces. On each test piece, bench marks were drawn 200 mm±2 mm apart from each other with respect to the center part of the test piece. The distance between the bench marks on the test piece before heating was measured at an accuracy of 0.1 mm. The test piece was hung in a hot air drier (manufactured by ESPEC Corp., PHH-202) in a no-load state, and a thermal treatment was performed under a heating condition of 160° C. for 10 minutes. The test piece was taken out from a thermostatic chamber and cooled to room temperature. Then, the length and the width were measured at the same part as the part where the initial measurement was performed. The dimensional change rate of each test piece was measured in the machine direction and the transverse direction as a percentage of the dimensional change relative to the initial value. As the dimensional change rate in each direction, the average of the measurements in the direction was used.

(5) Pinhole Resistance of Film

The number of pinholes was measured using a gelvo flex tester with a thermostatic chamber BE1006 manufactured by Tester Sangyo Co., Ltd., by the following method.

A polyester-based adhesive agent [a mixture of TM-569 (product name) and CAT-10L (product name) manufactured by Toyo-Morton, Ltd., in a mass ratio of 7.2/1 (solid content concentration 23%)] was coated to a film such that a resin solid content after drying was 3.2 g/m². Thereafter, 40 μm of a linear low density polyethylene film (L-LDPE film: manufactured by Toyobo Co., Ltd., LIX (registered trademark) L4102) was dry-laminated and then aged in an environment of 40° C. for 2 days to obtain a laminated film.

The obtained dry-laminated film was cut into a 28.0 cm (11 inches)×24.0 cm (9.4 inches) piece. The cut film was left and conditioned under a condition of a temperature of 23° C. and a relative humidity of 50% for 6 hours or longer. Thereafter, the rectangular test film was wound into a cylindrical shape having a diameter of 8.9 cm (3.5 inches). One end of the cylindrical-shaped film was fixed to the circumference of a disk-shaped fixing head in the gelvo flex tester. The other end of the cylindrical-shaped film was fixed to the circumference of a disk-shaped movable head in the tester that was opposed to the fixing head with a gap of 19.4 cm (7.6 inches) therebetween. Next, a flex test was performed repeatedly and continuously for 1000 cycles at a speed of 40 cycles per minute. One cycle of the flex test consists of the following: while the movable head was moved by 7.6 cm (3.5 inches) in the direction towards the fixing head along an axis between both heads opposed to each other in parallel, the movable head was rotated by 440°. Then, the movable head was moved linearly by 6.4 cm (2.5 inches) without rotation, and these actions were reversed to move the movable head back to the initial position. The flex test was performed at 1° C. Thereafter, the number of pinholes generated in a 19.4 cm (7.6 inches)×25.5 cm (11 inches) part in the tested film excluding the parts that were fixed to the circumferences of the fixing head and the movable head was counted (i.e., the number of pinholes per 495 cm² (77 square inches) was counted).

(6) Water-Resistant Lamination Strength (Lamination Strength Under Condition of Water Adhesion)

A laminated film made by a method similar to that described in the description of the pinhole resistance evaluation was cut into a strip shape having a width of 15 mm and a length of 200 mm. One end of the laminated film was peeled at the interface between the biaxially stretched polyamide film and the linear low density polyethylene film. The lamination strength was measured 3 times using an autograph (manufactured by Shimadzu Corporation) under a condition of a temperature of 23° C., a relative humidity of 50%, a tensile speed of 200 mm/minute, and a peeling angle of 90° while water was being dropped with a dropper to the peeling interface of the strip-shaped laminated film. The lamination strength was evaluated by the average value of the measurements.

(7) Relative Viscosity of Raw Material Polyamide

A polyamide solution was prepared by dissolving 0.25 g of polyamide in 96% sulfuric acid in a 25 ml measuring flask so as to have a concentration of 1.0 g/dl, and a relative viscosity was measured at 20° C. using the polyamide solution.

(8) Melting Point of Raw Material Polyamide

Measurement was performed according to JIS K7121 using a SSC5200 type differential scanning calorimeter manufactured by Seiko Instruments Inc., in a nitrogen atmosphere with a sample weight of 10 mg, a heating starting temperature of 30° C., and a temperature rising rate of 20° C./minute, to obtain an endothermic peak temperature (Tmp) as a melting point.

Example 1

Using an apparatus including an extruder having a bore diameter of 60 mm for a layer A, two extruders having a bore diameter of 25 mm for a layer B and a layer C, and a co-extruding T-die having a width of 380 mm, polyamide 6 (relative viscosity: 2.8, melting point: 220° C.) as a base layer (layer A), a mixture in which polyamide 6 (relative viscosity: 2.8, melting point: 220° C.) and a polyamide 6/66 copolymer (the ratio of polyamide 66 was 7% by mass, relative viscosity: 2.8, melting point: 198° C.) were blended at a mass ratio of 9/91 and 0.54% by mass of silica fine particles and 0.15% by mass of ethylene bisstearic acid amide were added and contained as an easily adhesive layer (layer B), and a mixture in which 0.54% by mass of silica fine particles and 0.15% by mass of ethylene bisstearic acid amide were added and contained in polyamide 6 (relative viscosity: 2.8, melting point: 220° C.) as a slippery layer (layer C) were melt-extruded. The base layer (layer A), the easily adhesive layer (layer B), and the slippery layer (layer C) were laminated in a feed block with a configuration of easily adhesive layer (layer B)/base layer (layer A)/slippery layer (layer C), and extruded from the T-die into a sheet. The sheet was brought into close contact with a cooling roll whose temperature was regulated to 20° C., to obtain a 200 μm laminated unstretched sheet.

The material used was dried before use such that the material had a moisture content of 0.1% by mass.

As the silica fine particles, particles having a pore volume of 1.6 ml/g and an average particle diameter of 3.9 μm were used.

The obtained laminated unstretched sheet was guided to a roll type stretching machine. The laminated unstretched sheet was stretched 1.7 times at 80° C. and then further stretched 1.85 times at 70° C. in the machine direction utilizing the difference between the circumferential speeds of rollers. Subsequently, this uniaxially stretched film was guided continuously to a tenter-type stretching machine and preheated at 110° C. Then, the uniaxially stretched film was stretched 1.2 times at 120° C., 1.7 times at 130° C., and 2.0 times at 160° C. in the transverse direction (MD), and subjected to a heat setting treatment at 210° C., and then a 3% relaxation treatment at 210° C. and a 2% relaxation treatment at 185° C. Then, the surface of the easily adhesive layer (layer B) was subjected to a corona discharge treatment, to obtain a three-layered laminated biaxially stretched polyamide film in which three types of layers, that is, the layer A, the layer B, and the layer C, were laminated in the order of layer B/layer A/layer C.

As for the thickness of the laminated stretched polyamide film, the structure of the feed block and the discharge quantities of the extruders were adjusted such that the laminated stretched polyamide film had a total thickness of 15 μm, the base layer (layer A) had a thickness of 12 μm, and each of the easily adhesive layer (layer B) and the slippery layer (layer C) on the front and back sides had a thickness of 1.5 μm.

Example 2

A laminated biaxially stretched polyamide film was made in the same manner as Example 1, except that the polyamide 6 and the polyamide 6/66 copolymer were blended at a mass ratio of 70/30 and melt-extruded as a base layer (layer A), a mixture in which the polyamide 6 and the polyamide 6/66 copolymer were blended at a mass ratio of 15/85 and silica fine particles (pore volume: 0.8 ml/g, average particle diameter: 2.7 μm) were added so as to be contained in 0.03% by mass was melt-extruded as an easily adhesive layer (layer B), and the polyamide 6 and MXD were blended at a weight ratio of 95/5 and melt-extruded as a slippery layer (layer C).

Example 3

A laminated biaxially stretched polyamide film was made in the same manner as Example 1, except that the polyamide 6 and the polyamide 6/66 copolymer were blended at a mass ratio of 95/5 and melt-extruded as a base layer (layer A), the polyamide 6 and the polyamide 6/66 copolymer were blended at a mass ratio of 30/70 and melt-extruded as an easily adhesive layer (layer B), and the polyamide 6 and MXD were blended at a weight ratio of 95/5 and melt-extruded as a slippery layer (layer C).

Example 4

A laminated biaxially stretched polyamide film was made in the same manner as Example 3, except that the polyamide 6 and the polyamide 6/66 copolymer were melt-extruded at a mass ratio of 40/60 as an easily adhesive layer (layer B).

Comparative Example 1

A laminated biaxially stretched polyamide film was made in the same manner as Example 3, except that a mixture in which the polyamide 6 and the polyamide 6/66 copolymer were blended at a mass ratio of 65/35 was melt-extruded as an easily adhesive layer (layer B).

Comparative Example 2

A laminated biaxially stretched polyamide film was made in the same manner as Example 3, except that a mixture in which the polyamide 6 and the polyamide 6/66 copolymer were blended at a mass ratio of 50/50 was melt-extruded as an easily adhesive layer (layer B).

Example 5

A laminated biaxially stretched polyamide film was made in the same manner as Example 1, except that a polyamide 6/12 copolymer (7024B, manufactured by Ube Industries, Ltd., relative viscosity: 2.6, melting point: 201° C.) was blended at a mass ratio of 9/91 instead of the polyamide 6/66 copolymer (the ratio of the polyamide 66 was 7% by mass, relative viscosity: 2.8, melting point: 198° C.).

Example 6

A laminated biaxially stretched polyamide film was made in the same manner as Example 5, except that the polyamide 6 and the polyamide 6/12 copolymer were blended at a mass ratio of 95/5 and melt-extruded as a base layer (layer A), the polyamide 6 and the polyamide 6/12 copolymer were melt-extruded as an easily adhesive layer (layer B) such that the ratio thereof was a mass ratio of 15/85, and the polyamide 6 and MXD were blended at a weight ratio of 95/5 and melt-extruded as a slippery layer (layer C).

Example 7

A laminated biaxially stretched polyamide film was made in the same manner as Example 6, except that the polyamide 6 and the polyamide 6/12 copolymer were blended at a mass ratio of 80/20 and melt-extruded as a base layer (layer A) and the polyamide 6 and the polyamide 6/12 copolymer were melt-extruded at a mass ratio of 30/70 as an easily adhesive layer (layer B).

Example 8

A laminated biaxially stretched polyamide film was made in the same manner as Example 6, except that the polyamide 6 and the polyamide 6/12 copolymer were melt-extruded at a mass ratio of 40/60 as an easily adhesive layer (layer B).

Comparative Example 3

A laminated biaxially stretched polyamide film was made in the same manner as Example 6, except that a mixture in which the polyamide 6 and the polyamide 6/12 copolymer were blended at a mass ratio of 65/35 was melt-extruded as an easily adhesive layer (layer B) and the polyamide 6 and MXD were blended at a weight ratio of 95/5 and melt-extruded as a slippery layer (layer C).

Comparative Example 4

A laminated biaxially stretched polyamide film was made in the same manner as Example 6, except that a mixture in which the polyamide 6 and the polyamide 6/12 copolymer were blended at a mass ratio of 50/50 was melt-extruded as an easily adhesive layer (layer B).

Example 9

A laminated biaxially stretched polyamide film was made in the same manner as Example 2, except that, instead of the said polyamide 6/66 copolymer (the ratio of the polyamide 66 was 7% by mass, relative viscosity: 2.8, melting point: 198° C.), a polyamide 6/66 copolymer (the ratio of the polyamide 66 was 25% by mass, relative viscosity: 2.8, melting point: 187° C.) was used.

The water-resistant lamination strength and other physical properties of the biaxially stretched polyamide films made in Examples 1 to 9 and Comparative Examples 1 to 4 are shown in Table 1.

since the content of the polyamide 6/66 copolymer or the polyamide 6/12 copolymer in the easily adhesive layer is low.

While the laminated stretched polyamide film of the present invention has been described above based on several examples, the present invention is not limited to the configurations set forth in the above examples, and modifications can be made as appropriate in the configurations by, for example, appropriately combining the configurations set forth in the examples without departing from the gist of the present invention.

INDUSTRIAL APPLICABILITY

The laminated stretched polyamide film of the present invention has excellent heat resistance, shock resistance, and pinhole resistance, and also has excellent water-resistant adhesiveness (water-resistant lamination strength). Therefore, the laminated stretched polyamide film can be suitably used for the application as a packaging material for packaging a liquid and the like.

The laminated stretched polyamide film of the present invention is applicable as a pickle bag, a large-size bag for a watery material for commercial use, and the like.

The invention claimed is:

1. A laminated stretched polyamide film that is a biaxially stretched polyamide film comprising three layers including layer B, layer A: a base layer, and layer C in this order, wherein
the layer A contains not lower than 65% by mass of polyamide 6,
the layer B contains 0 to 40% by mass of polyamide 6 and 60 to 100% by mass of a polyamide 6 copolymer in

TABLE 1

| | | | Example | | | | | | | | | Comparative Example | | | |
| --- | --- | --- | --- | --- | --- | --- | --- | --- | --- | --- | --- | --- | --- | --- | --- |
| | | | 1 | 2 | 3 | 4 | 5 | 6 | 7 | 8 | 9 | 1 | 2 | 3 | 4 |
| Composition of Layer A | polyamide 6 | parts by mass | 100 | 70 | 95 | 95 | 100 | 95 | 80 | 95 | 70 | 95 | 95 | 95 | 95 |
| | polyamide 6/66 | parts by mass | 0 | 30 | 5 | 5 | — | — | — | — | 30 | 5 | 5 | — | — |
| | polyamide 6/12 | parts by mass | — | — | — | — | 0 | 5 | 20 | 5 | — | — | — | 5 | 5 |
| Composition of Layer B | polyamide 6 | parts by mass | 9 | 15 | 30 | 40 | 9 | 15 | 30 | 40 | 15 | 65 | 50 | 65 | 50 |
| | polyamide 6/66 | parts by mass | 91 | 85 | 70 | 60 | — | — | — | — | 85 | 35 | 50 | — | — |
| | polyamide 6/12 | parts by mass | — | — | — | — | 91 | 85 | 70 | 60 | — | — | — | 35 | 50 |
| | fine particle | parts by mass | 0.54 | 0.03 | 0.54 | 0.54 | 0.54 | 0.54 | 0.54 | 0.54 | 0.03 | 0.54 | 0.54 | 0.54 | 0.54 |
| | fatty acid amide | parts by mass | 0.15 | — | 0.15 | 0.15 | 0.15 | 0.15 | 0.15 | 0.15 | — | 0.15 | 0.15 | 0.15 | 0.15 |
| Composition of Layer C | polyamide 6 | parts by mass | 100 | 95 | 95 | 95 | 100 | 95 | 95 | 95 | 95 | 95 | 95 | 95 | 95 |
| | polyamide 6/66 | parts by mass | — | — | — | — | — | — | — | — | — | — | — | — | — |
| | polyamide 6/12 | parts by mass | — | — | — | — | — | — | — | — | — | — | — | — | — |
| | polyamide MXD6 | parts by mass | — | 5 | 5 | 5 | — | 5 | 5 | 5 | 5 | 5 | 5 | 5 | 5 |
| | fine particle | parts by mass | 0.54 | 0.54 | 0.54 | 0.54 | 0.54 | 0.54 | 0.54 | 0.54 | 0.54 | 0.54 | 0.54 | 0.54 | 0.54 |
| | fatty acid amide | parts by mass | 0.15 | 0.15 | 0.15 | 0.15 | 0.15 | 0.15 | 0.15 | 0.15 | 0.15 | 0.15 | 0.15 | 0.15 | 0.15 |
| Overall thickness | | μm | 15 | 15 | 15 | 15 | 15 | 15 | 15 | 15 | 15 | 15 | 15 | 15 | 15 |
| Thickness ratio of Layer A | | % | 80 | 80 | 80 | 80 | 80 | 80 | 80 | 80 | 80 | 80 | 80 | 80 | 80 |
| Laminated configuration | | — | B/A/C | B/A/C | B/A/C | B/A/C | B/A/C | B/A/C | B/A/C | B/A/C | B/A/C | B/A/C | B/A/C | B/A/C | B/A/C |
| Coefficient of dynamic friction | | — | 0.67 | 0.66 | 0.71 | 0.69 | 0.51 | 0.64 | 0.42 | 0.38 | 0.68 | 0.72 | 0.67 | 0.65 | 0.68 |
| Impact strength | | J/15 μm | 1.05 | 1.11 | 1.17 | 1.21 | 1.02 | 1.11 | 1.17 | 1.20 | 1.05 | 1.01 | 0.95 | 0.98 | 0.90 |
| Heat shrinkage rate MD direction | | % | 1.1 | 1.0 | 1.0 | 0.9 | 1.0 | 1.0 | 1.1 | 0.9 | 1.1 | 1.0 | 0.9 | 1.0 | 1.0 |
| Heat shrinkage rate TD direction | | % | 1.4 | 1.4 | 1.3 | 1.2 | 1.3 | 1.2 | 1.4 | 1.3 | 1.3 | 0.9 | 1 | 1.0 | 1.1 |
| Flex pinhole resistance | | piece | 4 | 3 | 3 | 2 | 4 | 4 | 2 | 2 | 2 | 2 | 3 | 3 | 3 |
| Water-resistant lamination strength | | N/15 mm | 4.0 | 3.5 | 2.6 | 2.3 | 3.8 | 3.3 | 2.6 | 2.2 | 3.7 | 0.8 | 1.3 | 0.9 | 1.2 |

As is clear from the results in Table 1, it is found that sufficient water-resistant lamination strength is obtained in Examples 1 to 9 in which the easily adhesive layer (layer B) contains not lower than 60% by mass of the polyamide 6/66 copolymer or the polyamide 6/12 copolymer.

On the other hand, sufficient water-resistant lamination strength is not obtained in Comparative Examples 1 to 4 which a ratio of a copolymerization component in the copolymer is 3 to 35% by mass, and the layer C contains not lower than 70% by mass of polyamide 6 and 0.05 to 1% by mass of fine particles having an average particle diameter of 0.1 to 10 μm.

2. The laminated stretched polyamide film according to claim 1, wherein the layer A contains not lower than 70% by mass of the polyamide 6.

3. The laminated stretched polyamide film according to claim 1, wherein
the laminated stretched polyamide film has a thickness of 5 to 30 μm,
the layer A has a thickness of not smaller than 4.0 μm,
the layer B has a thickness of not smaller than 0.5 μm, and
the layer C has a thickness of not smaller than 0.5 μm.

4. The laminated stretched polyamide film according to claim 1, wherein the polyamide 6 copolymer is a polyamide 6/66 copolymer.

5. The laminated stretched polyamide film according to claim 4, wherein the layer A contains 0.5 to 30% by mass of the polyamide 6/66 copolymer.

6. The laminated stretched polyamide film according to claim 1, wherein the polyamide 6 copolymer is a polyamide 6/12 copolymer.

7. The laminated stretched polyamide film according to claim 6, wherein the layer A contains 0.5 to 30% by mass of the polyamide 6/12 copolymer.

8. The laminated stretched polyamide film according to claim 1, wherein the laminated stretched polyamide film has a water-resistant lamination strength of not lower than 2.0 N/15 mm.

9. The laminated stretched polyamide film according to claim 2, wherein
the laminated stretched polyamide film has a thickness of 5 to 30 μm,
the layer A has a thickness of not smaller than 4.0 μm,
the layer B has a thickness of not smaller than 0.5 μm, and
the layer C has a thickness of not smaller than 0.5 μm.

10. The laminated stretched polyamide film according to claim 9, wherein the laminated stretched polyamide film has a water-resistant lamination strength of not lower than 2.0 N/15 mm.

11. The laminated stretched polyamide film according to claim 2, wherein the polyamide 6 copolymer is a polyamide 6/66 copolymer.

12. The laminated stretched polyamide film according to claim 11, wherein the layer A contains 0.5 to 30% by mass of the polyamide 6/66 copolymer.

13. The laminated stretched polyamide film according to claim 2, wherein the polyamide 6 copolymer is a polyamide 6/12 copolymer.

14. The laminated stretched polyamide film according to claim 13, wherein the layer A contains 0.5 to 30% by mass of the polyamide 6/12 copolymer.

15. The laminated stretched polyamide film according to claim 2, wherein the laminated stretched polyamide film has a water-resistant lamination strength of not lower than 2.0 N/15 mm.

16. The laminated stretched polyamide film according to claim 3, wherein the polyamide 6 copolymer is a polyamide 6/66 copolymer.

17. The laminated stretched polyamide film according to claim 16, wherein the layer A contains 0.5 to 30% by mass of the polyamide 6/66 copolymer.

18. The laminated stretched polyamide film according to claim 3, wherein the polyamide 6 copolymer is a polyamide 6/12 copolymer.

19. The laminated stretched polyamide film according to claim 18, wherein the layer A contains 0.5 to 30% by mass of the polyamide 6/12 copolymer.

20. The laminated stretched polyamide film according to claim 3, wherein the laminated stretched polyamide film has a water-resistant lamination strength of not lower than 2.0 N/15 mm.

* * * * *